US012577686B2

(12) United States Patent (10) Patent No.: US 12,577,686 B2
Mortensen et al. (45) **Date of Patent: *Mar. 17, 2026**

(54) AMBIENT AIR SEPARATION AND SOEC FRONT-END FOR AMMONIA SYNTHESIS GAS PRODUCTION

(71) Applicant: HALDOR TOPSØE A/S, Kgs. Lyngby (DK)

(72) Inventors: Peter Mølgaard Mortensen, Roskilde (DK); John Bøgild Hansen, Humlebæk (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 217 days.

This patent is subject to a terminal disclaimer.

(21) Appl. No.: 17/421,458

(22) PCT Filed: Mar. 31, 2020

(86) PCT No.: PCT/EP2020/059119
§ 371 (c)(1),
(2) Date: Jul. 8, 2021

(87) PCT Pub. No.: WO2020/201282
PCT Pub. Date: Oct. 8, 2020

(65) Prior Publication Data
US 2022/0081785 A1 Mar. 17, 2022

(30) Foreign Application Priority Data

Apr. 5, 2019 (DK) ............................. PA 2019 00424

(51) Int. Cl.
| | |
|---|---|
| *C25B 1/042* | (2021.01) |
| *C01B 3/02* | (2006.01) |
| *C01B 3/025* | (2026.01) |
| *C01B 21/04* | (2006.01) |
| *C25B 1/04* | (2021.01) |
| *C25B 1/27* | (2021.01) |
| *C25B 9/70* | (2021.01) |
| *B01D 53/32* | (2006.01) |

(52) U.S. Cl.
CPC ................ *C25B 1/27* (2021.01); *C01B 3/025* (2013.01); *C25B 1/042* (2021.01); *C25B 9/70* (2021.01); *B01D 53/326* (2013.01); *C01B 21/0405* (2013.01); *C25B 1/04* (2013.01)

(58) Field of Classification Search
CPC .............. C01C 1/04; C01B 3/025; C25B 1/04
See application file for complete search history.

(56) References Cited

U.S. PATENT DOCUMENTS

| | | | | | |
|---|---|---|---|---|---|
| 1,386,760 | A | * | 8/1921 | Bosch ................... | C01C 1/0464 |
| | | | | | 423/362 |
| 5,348,592 | A | * | 9/1994 | Garg ...................... | C21D 1/763 |
| | | | | | 148/216 |

| | | | | | |
|---|---|---|---|---|---|
| 8,623,313 | B2 | * | 1/2014 | Nakamura .............. | C01B 3/042 |
| | | | | | 423/352 |
| 2006/0049063 | A1 | | 3/2006 | Murphy et al. | |
| 2008/0311022 | A1 | * | 12/2008 | Carrington ............ | C01C 1/0405 |
| | | | | | 204/242 |
| 2012/0241328 | A1 | | 9/2012 | Joshi et al. | |
| 2015/0004510 | A1 | * | 1/2015 | Bertier .............. | H01M 8/04731 |
| | | | | | 205/628 |
| 2017/0284667 | A1 | | 10/2017 | Ostuni et al. | |
| 2020/0056290 | A1 | | 2/2020 | Yang et al. | |

FOREIGN PATENT DOCUMENTS

| | | | |
|---|---|---|---|
| AU | 2016101434 | A4 | 9/2016 |
| CN | 105836759 | A | 8/2016 |
| DE | 202018106745 | U1 | 12/2018 |
| JP | H11292531 | A | 10/1999 |
| WO | 2008154257 | A2 | 12/2008 |
| WO | 2019020377 | A1 | 1/2019 |
| WO | 2019072608 | A1 | 4/2019 |

OTHER PUBLICATIONS

Cinti et al., "Coupling Solid Oxide Electrolyser (SOE) and ammonia production plant", Sep. 16, 2016, Applied Energy, 192, 466-476. (Year: 2016).*
Danish Search Report for Danish Application No. PA 201900424 dated Oct. 30, 2019 (6 pages).
International Search Report (PCT/ISA/210) with translation and Written Opinion (PCT/ISA/237) mailed on Jul. 2, 2020, by the European Patent Office as the International Searching Authority for International Application No. PCT/EP2020/059119.
Cinti, Giovanni, et al., "Coupling Solid Oxide Electrolyser (SOE) and ammonia production plant", Applied Energy, Elsevier Science Publishers, GB, Sep. 16, 2016 (11 pages).
Hansen, John B., et al., "Solid Oxide Cell Enabled Ammonia Synthesis and Ammonia Based power Production", NH3 Fuel Conference, Minneapolis, Nov. 2, 2017 AlChE Annual Meeting, Topical Conference: NH3 Energy+, Oct. 1, 2017, pp. 1-18.

* cited by examiner

*Primary Examiner* — Luan V Van
*Assistant Examiner* — Andrew Koltonow
(74) *Attorney, Agent, or Firm* — Boone IP Law

(57) ABSTRACT

In a method for generating ammonia synthesis gas by electrolysis, comprising the steps of compressing air and feeding it to an air separation process, in which the content of nitrogen is concentrated while the content of oxygen and $CO_2$ is diluted, feeding a mixture of steam and the compressed and refined air into the electrolysis unit or into the first of a series of electrolysis units and passing the outlet from one electrolysis unit to the inlet of the next electrolysis unit, either together with air added after each electrolysis unit or only adding air after the last electrolysis unit, the electrolysis units are run in thermoneutral or endothermal mode and the nitrogen part of the synthesis gas is provided by burning the hydrogen produced by steam electrolysis by the refined air in or between the electrolysis units.

10 Claims, No Drawings

AMBIENT AIR SEPARATION AND SOEC FRONT-END FOR AMMONIA SYNTHESIS GAS PRODUCTION

The present invention relates to an improved process for generating synthesis gas for ammonia production.

A typical ammonia-producing plant first converts a desulfurized hydrocarbon gas, such as natural gas (i.e. methane) or LPG (a liquefied petroleum gas, such as propane and butane) or petroleum naphtha into gaseous hydrogen by steam reforming. The hydrogen is then combined with nitrogen to produce ammonia via the Haber-Bosch process $$3 H_2 + N_2 \rightarrow 2 NH_3$$

Thus, the synthesis of ammonia ($NH_3$) requires a synthesis gas (syngas) comprising hydrogen ($H_2$) and nitrogen ($N_2$) in a suitable molar ratio of about 3:1.

Ammonia is one of the most widely produced chemicals, and it is synthesized directly using gaseous hydrogen and nitrogen as reactants without precursors or by-products. In its gaseous state, nitrogen is largely available as $N_2$, and it is normally produced by separating it from atmospheric air. The production of hydrogen ($H_2$) is still challenging and, for industrial synthesis of ammonia, it is most often obtained from steam methane reforming (SMR) of natural gas. Moreover, when air is used for reforming processes, $N_2$ is also introduced, thus rendering the need for an air separation unit superfluous, but a clean-up process is necessary to remove oxygen-containing species, such as $O_2$, CO, $CO_2$ and $H_2O$, in order to prevent the catalysts from being poisoned in the ammonia converter. Carbon dioxide is a product of SMR and can be separated and recovered inside the plant. Hydrogen production is therefore a critical process in ammonia synthesis, and a sustainable production of ammonia is desirable to reduce the consumption of a primary source, such as natural gas, and to avoid $CO_2$ emissions from the process.

In an earlier patent application by the Applicant (PCT/EP 2018/076616, now published as WO 2019/072608 A1), a process is described wherein synthesis gas for ammonia production is prepared by electrolysis using solid oxide electrolysis cell (SOEC) stacks without having to use air separation. That process uses a combination of water electrolysis and air combustion to facilitate high temperature electrolysis of steam, which effectively means that any oxygen in the water and air feed can be separated into a separate stream and an intermediate product of $H_2/N_2$ in a ratio which is suitable for ammonia production. The present invention can be seen as an enlarged embodiment of the process of PCT/EP2018/076616, in which the air fed to the SOEC stacks has gone through an air separation step upstream the SOEC stacks. The air separation is ideally carried out by using a membrane or alternatively by using pressure swing adsorption (PSA) or temperature swing adsorption (TSA). This way, part of the oxygen is removed from the air and less oxygen needs to be burned and subsequently separated in the SOEC.

This allows for a smaller stack area in the SOEC and an improved process integration.

The teaching of PCT/EP2018/076616 allows for producing ammonia synthesis gas purely from sustainable resources. By combining this with partial air separation, an improved process integration can be achieved, as the oxygen in the air feed can be balanced to exactly match the required steam production in the SOEC layout combined with the ammonia loop. In addition, the upstream air separation reduces the content of other impurities in the air, especially $CO_2$.

By only doing partial air separation, the operating costs of the initial air separation step can be kept very low, as a high selectivity for oxygen rejection can be achieved in the separation step when the remaining oxygen content is left at say 15%, 10%, or even 5%, or potentially also down to 2%.

So far, the standard solution within this field has been to perform a two-step reforming front-end for an ammonia plant which is operated exclusively on fossil fuels.

The preparation of ammonia synthesis gas by electrolysis has been described in various patents and patent applications. Thus, a method for the anodic electrochemical synthesis of ammonia gas is described in US 2006/0049063. The method comprises providing an electrolyte between an anode and a cathode, oxidizing negatively charged nitrogen-contaming species and negatively charged hydrogen-containing species present in the electrolyte at the anode to form adsorbed nitrogen species and hydrogen species, respectively, and reacting the adsorbed nitrogen species with the adsorbed hydrogen species to form ammonia.

In US 2012/0241328, ammonia is synthesized using electrochemical and non-electrochemical reactions. The electrochemical reactions occur in an electrolytic cell having a lithium ion-conductive membrane that divides the electrochemical cell into an anolyte compartment and a catholyte compartment, the latter including a porous cathode closely associated with the lithium ion-conductive membrane.

WO 2008/154257 discloses a process for the production of ammonia that includes the production of nitrogen from the combustion of a stream of hydrogen mixed with air. Hydrogen used to produce the nitrogen for an ammonia combustion process may be generated from the electrolysis of water. Hydrogen produced by electrolysis of water may also be combined with nitrogen to produce ammonia.

So far, little attention has been paid to ammonia production using synthesis gas produced by electrolysis, especially generated using SOEC stacks. Recently, the design and analysis of a system for the production of "green" ammonia using electricity from renewable energy sources has been described (Applied Energy 192 (2017) 466-476). In this concept, solid oxide electrolysis (SOE) for hydrogen production is coupled with an improved Haber-Bosch reactor, and an air separator is included to supply pure nitrogen. An ammonia production with zero $CO_2$ emission is said to be obtainable with a 40% power input reduction compared to equivalent plants.

A flexible concept for the synthesis of ammonia from intermittently generated $H_2$ is described (Chem. Ing. Tech. 86 No. 5 (2014), 649-657) and compared to the widely discussed power-to-gas concepts on a technical and economical level. The electrolytic synthesis of ammonia in molten salts under atmospheric pressure has been described (J. Am. Chem. Soc. 125 No. 2 (2003), 334-335), in which a new electrochemical method with high current efficiency and lower temperatures than in the Haber-Bosch process is used. In this method, nitride ion ($N^{3-}$), produced by the reduction of nitrogen gas at the cathode, is anodically oxidized and reacts with hydrogen to produce ammonia at the anode.

Frattini et al. (Renewable Energy 99 (2016), 472-482) describe a system approach in energy evaluation of different renewable energy sources integrated in ammonia production plants. The impact of three different strategies for renewables integration and scale-up sustainability in the ammonia synthesis process was investigated using thermochemical simulations. For a complete evaluation of the benefits of the overall system, the balance of plant, the use of additional units and the equivalent greenhouse gas emissions have been considered.

Pfromm (J. Renewable Sustainable Energy 9 (2017), 034702) describes and sums up the most recent state of the art and especially the renewed interest in fossil-free ammonia production and possible alternatives to the Haber Bosch process.

Wang et al. (AIChE Journal 63 No. 5 (2017), 1620-1637) deal with an ammonia-based energy storage system utilizing a pressurized reversible solid oxide fuel cell (R-SOFC) for power conversion, coupled with external ammonia synthesis and decomposition processes and a steam power cycle. Pure oxygen, produced as a side product in electrochemical water splitting, is used to drive the fuel cell.

Applicant's earlier patent application PCT/EP 2018/076616, mentioned above, concerns a method for generating ammonia synthesis gas by electrolysis, comprising feeding a mixture of steam and compressed air into the first of a series of electrolysis units and passing the outlet from one electrolysis unit to the inlet of the next electrolysis unit together with air. The electrolysis units are run in endothermal mode, and the nitrogen part of the synthesis gas is provided by burning the hydrogen produced by steam electrolysis by air in or between the electrolysis units. The electrolysis units are preferably solid oxide electrolysis cell (SOEC) stacks.

The method according to PCT/EP 2018/076616, however, allows for producing ammonia synthesis gas from sustainable resources only. Now it has turned out that, by combining this method with partial air separation, an improved process integration can be achieved as the oxygen in the air feed can be balanced to exactly match the required steam production in the SOEC layout combined with the ammonia loop. In addition, the upstream air separation reduces the content of other impurities in the air, especially $CO_2$. So, reducing the content of $CO_2$ upstream the SOEC allows for a simplification of the process layout, because a potential $CO/CO_2$ removal upstream the ammonia loop then may be avoided, or at least it can be much simplified.

So the present invention provides a method for generating synthesis gas for ammonia production by electrolysis using SOEC stacks and a relatively small air separation step. The method avoids using an energy intensive air separation unit for high purity nitrogen production (cryogenic, pressure swing adsorption or the like) by taking advantage of the ability of being operated in an endothermal mode, and it provides the necessary nitrogen by burning the refined air from the relatively small air separation step with hydrogen produced by steam electrolysis to remove the residual air. The combustion of hydrogen and residual oxygen can take place inside the stacks or between separate stacks.

More specifically, the invention relates to a method for generating ammonia synthesis gas by electrolysis, said method comprising the steps of:

compressing air and feeding it to an air separation process, in which the content of nitrogen is concentrated while the content of oxygen and $CO_2$ is diluted, feeding a mixture of steam and the compressed and refined air into the electrolysis unit or into the first of a series of electrolysis units and passing the outlet from one electrolysis unit to the inlet of the next electrolysis unit, either together with air added after each electrolysis unit or only adding air after the last electrolysis unit, wherein the electrolysis units are run in thermoneutral or endothermal mode and the nitrogen part of the synthesis gas is provided by burning the hydrogen produced by steam electrolysis by the refined air in or between the electrolysis units.

The membrane unit is preferably a polymer membrane unit. Alternatively, a ceramic membrane, pressure swing adsorption (PSA) or temperature swing adsorption (TSA) can be used.

The effect of using ambient air separation front-end using a membrane according to the invention is described in more detail in the following calculation examples.

EXAMPLE 1

It has been verified that an air separation membrane installed front-end of the SOEC gives a good synergy. A simple calculation using compressed air on one side of a membrane and non-compressed air as sweep gas on the other side indicates that the oxygen concentration in the feed air can be reduced from 21% to 4.1%. The calculation is based on feed air (21% $O_2$ and 79% $N_2$ plus 400 ppm $CO_2$) at 10 barg (10 kNm$^3$/h) and a sweep gas (air, i.e. 21% $O_2$ and 79% $N_2$ plus 400 ppm $CO_2$) at 0.5 barg (10 kNm$^3$/h). The resulting feed air to the SOEC (6.7 kNm$^3$/h) at 9 barg consists of 4.1% $O_2$ and 95.9% $N_2$.

EXAMPLE 2

Since $CO_2$ permeates approximately 30 times faster than $N_2$, a membrane will be able to separate off $CO_2$ effectively. At 30 bar, the calculation would look like this (dependent of the desired $O_2$ concentration): Based on feed air (21% $O_2$ and 79% $N_2$ plus 400 ppm $CO_2$) at 30 bar and a sweep gas (air, i.e. 21% $O_2$ and 79% $N_2$ plus 400 ppm $CO_2$) at 0.5 bar, the resulting feed air to the SOEC at 30 bar would consist of 3.3% $O_2$ and 96.6% $N_2$ plus 20 ppm $CO_2$.

The invention claimed is:

1. A method for generating ammonia synthesis gas by electrolysis, said method comprising the steps of:

compressing air and feeding it to an air separation process to form a compressed and refined air, in which the content of nitrogen is concentrated while the content of oxygen and $CO_2$ is diluted;

feeding a mixture of steam and the compressed and refined air into a first of a series of electrolysis units;

producing hydrogen by steam electrolysis in the electrolysis units;

providing nitrogen and steam by burning the hydrogen with the compressed and refined air in or between the electrolysis units, wherein the burning produces a stream including steam and nitrogen which is fed to the next electrolysis unit; and passing an outlet from one electrolysis unit to an inlet of a next electrolysis unit, either together with compressed and refined air added after each electrolysis unit or only adding compressed and refined air after a last electrolysis unit, wherein the electrolysis units are run in thermoneutral or endothermal mode, wherein the nitrogen part of the synthesis gas is provided by burning the hydrogen produced by steam electrolysis with the compressed and refined air in the electrolysis units.

2. Method according to claim 1, wherein the air separation process comprises a polymer membrane unit or a ceramic membrane.

3. Method according to claim 1, wherein the air separation process comprises a pressure swing adsorption (PSA) unit or a temperature swing adsorption (TSA) unit.

4. Method according to claim 1, wherein the method comprises passing the outlet from one electrolysis unit to the inlet of the next electrolysis unit together with compressed and refined air added after each electrolysis unit.

5. Method according to claim 1, wherein the method comprises passing the outlet from one electrolysis unit to the inlet of the next electrolysis unit and only adding compressed and refined air after the last electrolysis unit.

6. A method for generating ammonia synthesis gas by electrolysis, said method comprising the steps of:

compressing air and feeding it to an air separation process to form a compressed and refined air, in which the content of nitrogen is concentrated while the content of oxygen and $CO_2$ is diluted;

feeding a mixture of steam and the compressed and refined air into a first of a series of electrolysis units; and passing an outlet from one electrolysis unit to an inlet of a next electrolysis unit, either together with compressed and refined air added after each electrolysis unit or only adding compressed and refined air after a last electrolysis unit, wherein the electrolysis units are run in thermoneutral or endothermal mode and the nitrogen part of the synthesis gas is provided by burning hydrogen produced by steam electrolysis with the compressed and refined air in or between the electrolysis units, wherein the burning produces steam, which is fed to the next electrolysis unit, wherein the nitrogen part of the synthesis gas is provided by burning the hydrogen produced by steam electrolysis with the compressed and refined air in the electrolysis units.

7. Method according to claim 1, wherein the air separation process dilutes the content of oxygen to 2-15% in the compressed and refined air.

8. Method according to claim 1, wherein the air separation process dilutes the content of oxygen to 2-10% in the compressed and refined air.

9. Method according to claim 1, wherein the air separation process dilutes the content of oxygen to 2-5% in the compressed and refined air.

10. Method according to claim 1, wherein the content of oxygen in the compressed and refined air feed is balanced to match a required amount of steam for electrolysis.

\* \* \* \* \*